United States Patent

[11] 3,568,955

[72] Inventor James E. Mc Devitt
 The Center, Martinsburg, W. Va. 25401
[21] Appl. No. 786,574
[22] Filed Dec. 24, 1968
[45] Patented Mar. 9, 1971
 Continuation-in-part of application Ser. No. 680,271, Nov. 2, 1967, abandoned.

[54] BLOWHARD VTOL AIRCRAFT
 6 Claims, 6 Drawing Figs.
[52] U.S. Cl. .................................................. 244/23
[51] Int. Cl. ............................................. B64c 29/00
[50] Field of Search ...................................... 244/12, 23

[56] References Cited
 UNITED STATES PATENTS
| | | | |
|---|---|---|---|
| 2,969,032 | 1/1961 | Pinnes | 244/23(X) |
| 2,990,137 | 6/1961 | Willis | 244/12 |
| 3,199,809 | 8/1965 | Modesti | 244/12 |
| 3,297,278 | 1/1967 | Hawkins | 244/23 |

FOREIGN PATENTS
| | | | |
|---|---|---|---|
| 788,852 | 1/1958 | Great Britain | 244/23 |
| 809,947 | 3/1959 | Great Britain | 244/23 |
| 915,347 | 1/1963 | Great Britain | 244/23 |
| 932,948 | 7/1963 | Great Britain | 244/23 |

Primary Examiner—Milton Buchler
Assistant Examiner—James E. Pittenger
Attorney—Watson, Cole, Grindle & Watson ABSTRACT: This invention relates to vehicles for the transportation, thru the air, of goods and persons. It contemplates the use, as a power source, of a jet engine the axis of which is vertically disposed with the intake uppermost and the discharge port lowermost, the structure of the vehicle encircling the engine. The products of combustion are conducted by conduits to outlet ports disposed in a circle the center of which is approximately on the axis of the engine and means is provided for controlling, and supplementing if necessary, the outflow of products of combustion in such manner as to supply maneuvering power.

PATENTED MAR 9 1971

3,568,955

SHEET 1 OF 3

INVENTOR,
JAMES E. McDEVITT
BY Watson, Cole, Grindle & Watson
ATTORNEYS

INVENTOR,
JAMES E. McDEVITT
BY Watson, Cole, Grindle & Watson
ATTORNEYS

BLOWHARD VTOL AIRCRAFT

This application is a continuation-in-part of my U.S. Pat. application Ser. No. 680,271, filed Nov. 2, 1967, and now abandoned.

Figure 1:
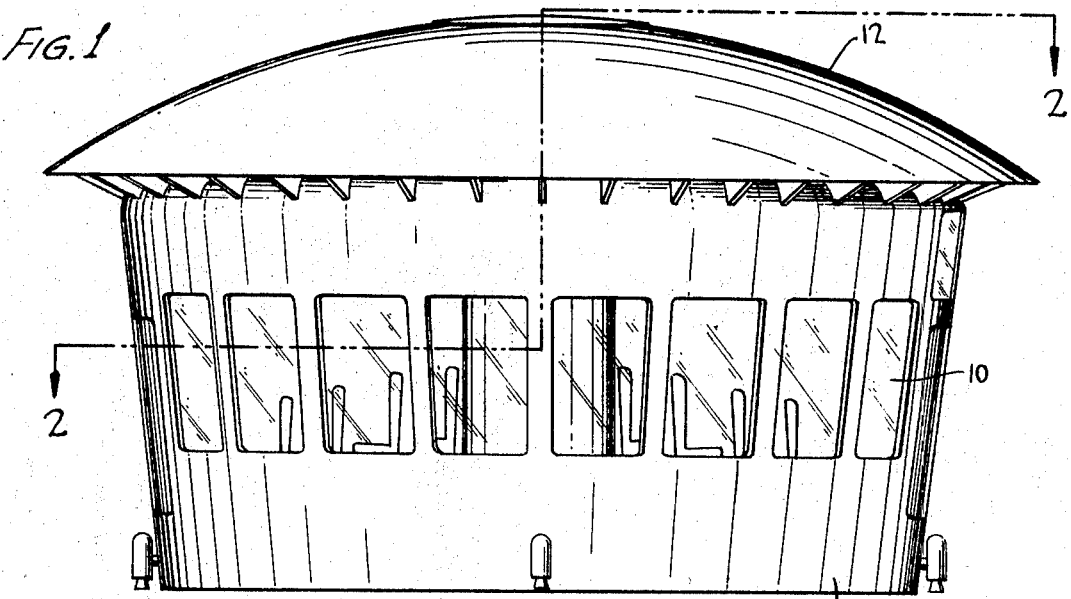
Figure 2:
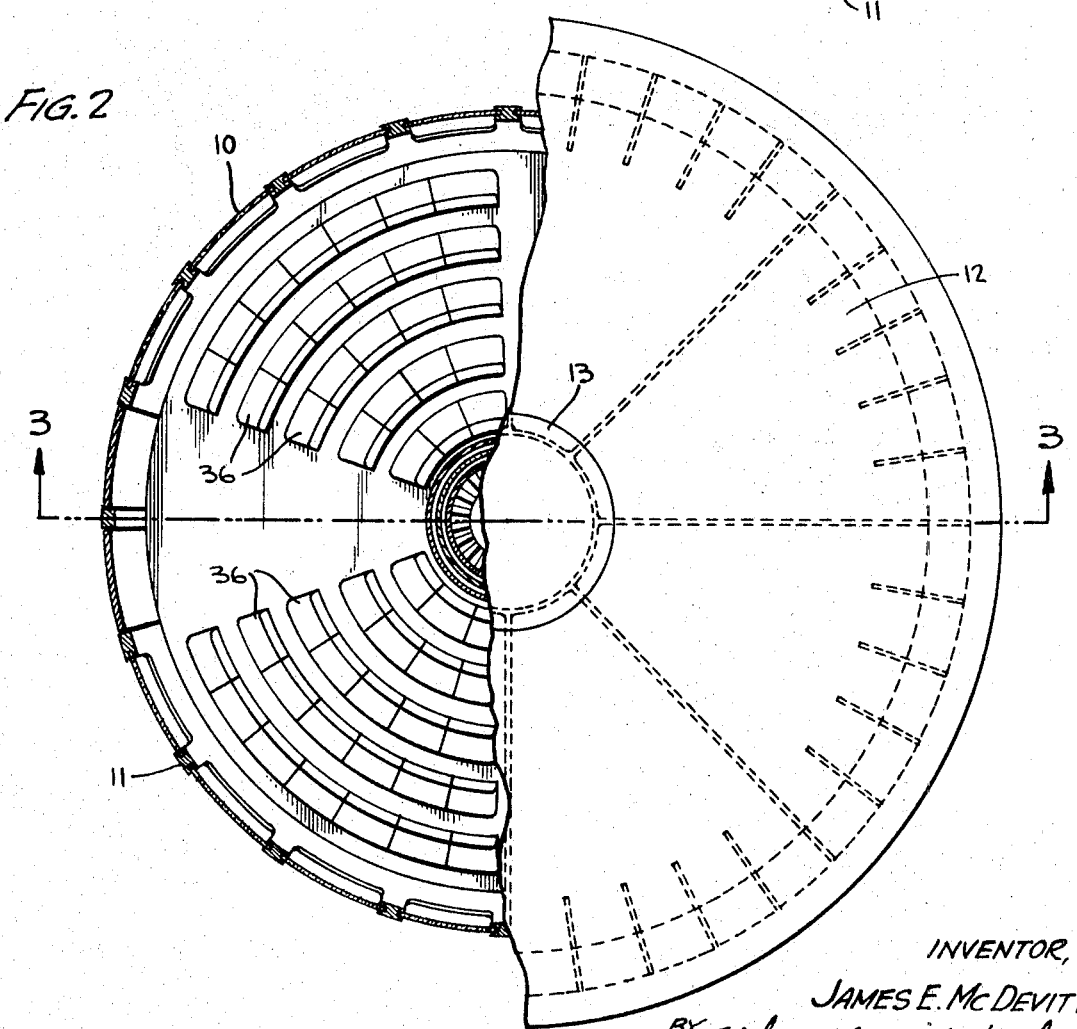
Figure 3:
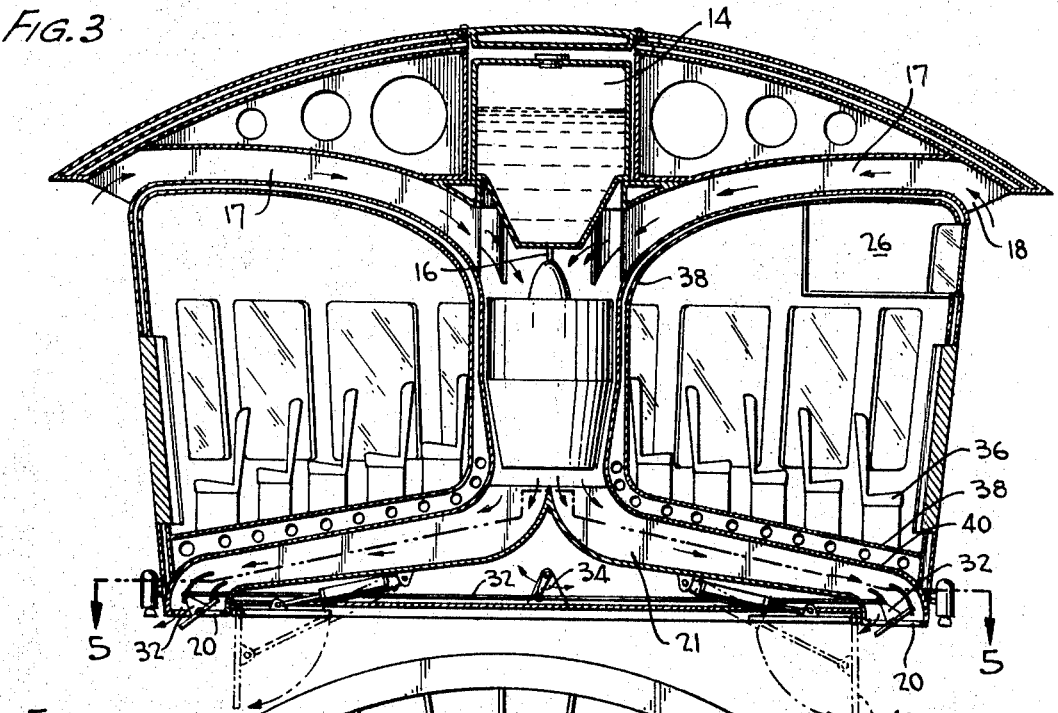
Figure 4:
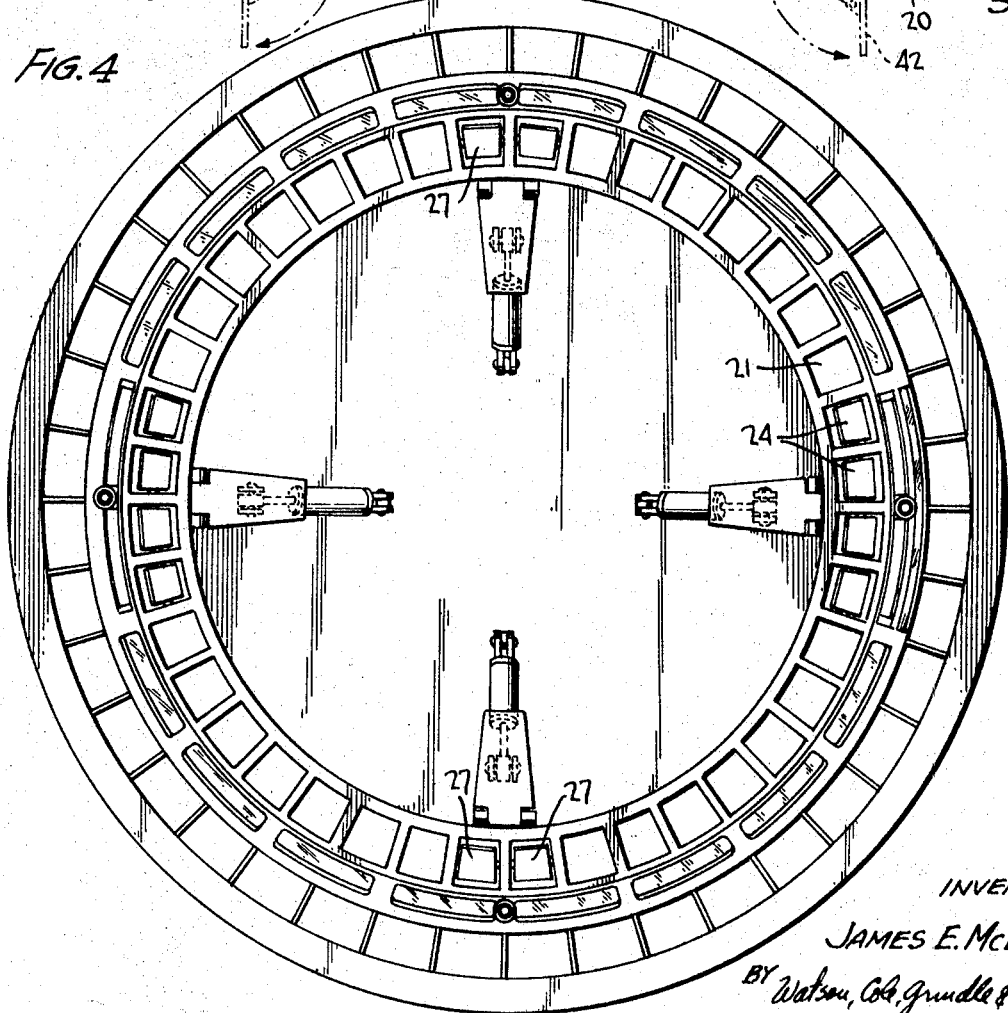
Figure 5:
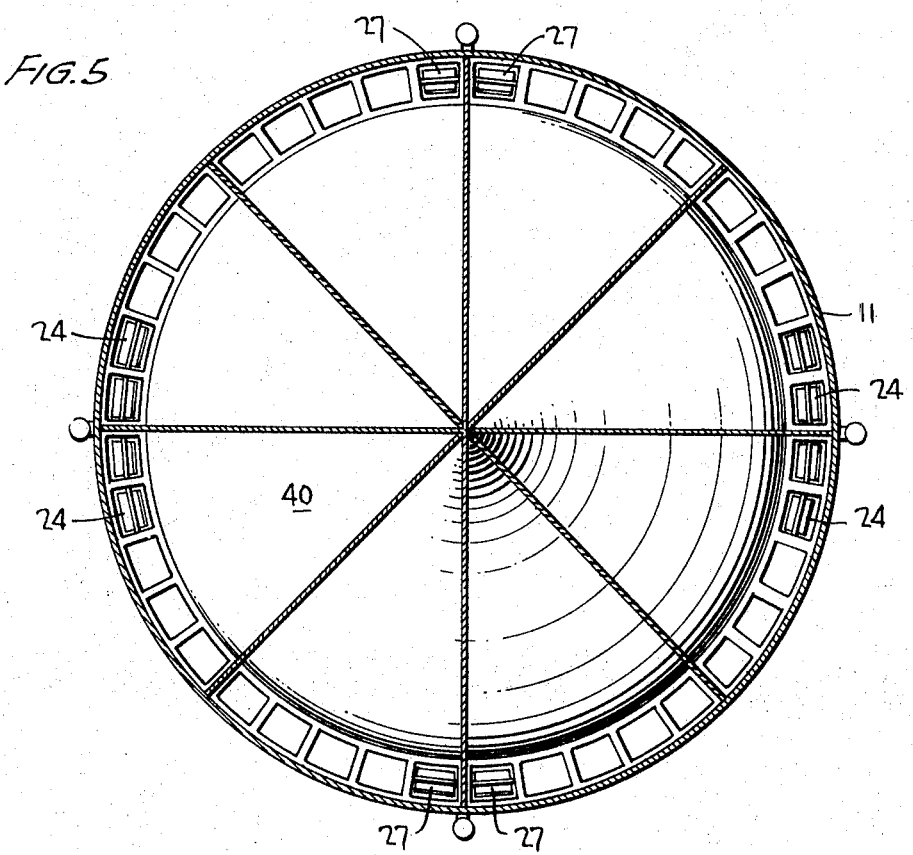
Figure 6:
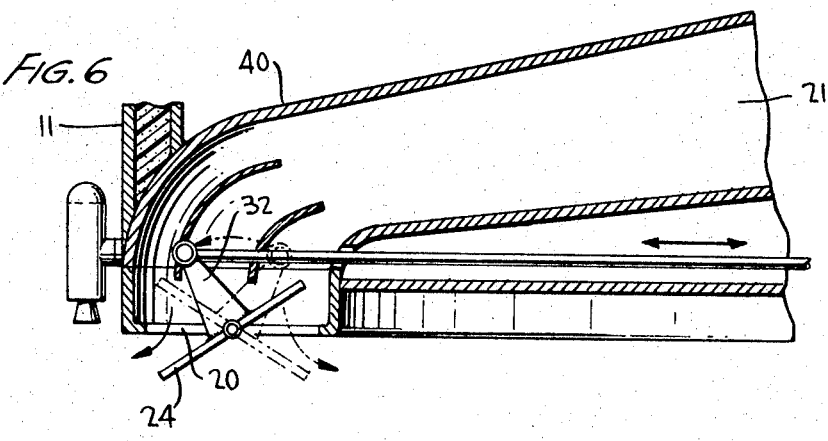

The aerial vehicle hereinafter described and claimed is preferably substantially cylindrical with the jet engine power plant disposed with its axis substantially coincident with the axis of the cylinder, the passenger or goods storage space encircling the engine, the objective being to provide large carrying capacity in a vehicle of simple design and which is highly maneuverable both vertically and horizontally. The gaseous discharge from the engine is conducted to discharge ports some or all of which are provided with adjustable dampers the positions of which are under the control of the operator of the vehicle, who, by regulating the angular positions of the dampers may cause the vehicle to move in the direction desired and at the speed desired. One embodiment of the invention is illustrated in the accompanying drawings in which:

FIG. 1 is a side elevation of the aircraft;
FIG. 2 is a view from above, the roof being broken away to present a view of the interior;
FIG. 3 is an axial section:
FIG. 4 is a bottom view of the aircraft;
FIG. 5 is a section on line 5—5 of FIG. 3; and
FIG. 6 is a vertical section through the terminal end of one of the conduits for the discharge of products of combustion.

As viewed from the exterior, the aircraft is generally cylindrical, tapering slightly preferably to provide occupants with maximum opportunity to observe objects below when in flight, through windows 10. The sidewall 11 of the aircraft is of sheet metal, likewise the top or roof 12 the roof being formed as a portion of a sphere with an axial aperture provided with a closure 13 which when removed, permits the introduction of fuel into the cylindrical fuel tank 14.

The necessary power for flight is provided by a jet engine 15, the axis of which is coincident with the axis of the aircraft, or nearly so, the liquid fuel being supplied by gravity from the fuel tank 14, passing downwardly through suitable conduits, one being diagrammatically illustrated at 16.

Air to support combustion is conducted to the intake of the engine through a series of radial ducts 17 having inlet ports 18 disposed in a circular series located at a higher level than the engine intake and curving downwardly as shown to deliver air streams directly into the engine intake port. The products of combustion which issue from the discharge port of the engine are conducted downwardly and outwardly to a circular series of discharge ports 20 through a series of radially extending ducts 21 the exiting streams of gas being downwardly directed to provide lifting force to elevate the aircraft and maintain it at a desired elevation in flight.

Opposed groups of discharge ports 20 are provided with pivotally mounted dampers for directing the outflowing streams of heated gas toward or away from the axis of the aircraft in order that the desired lateral movement of the aircraft may be obtained. Thus four such dampers 24, adjustably mounted in a series of four adjacent discharge ports 20, at what may be termed the front of the aircraft, and four such adjustably mounted dampers 25, positioned in four diametrically opposed ports 20, may be suitably manipulated by an operator located at position 26, to cause the aircraft to move forwardly or rearwardly in a generally horizontal direction, and by adjusting the positions of dampers 27, the products of combustion issuing through adjacent discharge ports 20 located at 90° away from those in which dampers 24 are positioned, lateral or sideways motion of the aircraft may be obtained. By adjusting dampers 24 and 27 simultaneously, the aircraft may be moved laterally in any desired direction. Any suitable mechanism may be employed to secure the desired adjustment of the dampers described and, as shown, the dampers are supported for rocking movement about axes midway between their outer and inner edges. Each conduit 21 is provided, at a point immediately anterior to its discharge port 20, with curved deflecting vanes 30, which assist in securing the desired downward flow of the issuing gases.

A means for simultaneously operating tow sets of dampers positioned diametrically opposite each other is illustrated in FIGS. 1 and 6. Each damper is provided with a rigid arm 32 and these arms are connected by a rod 33 which in turn may be reciprocated by a centrally located pivotally supported arm 34 which may be operated by the pilot through suitable instant control means.

The space, annular in horizontal section, between the engine and generally cylindrical wall of the aircraft will receive either persons or cargo to be transported, seats 36 being provided when passengers are to be carried, suitable doors being provided for the entry or exiting of goods or passengers. The passenger or goods receiving space is insulated from the heat of the engine and exhaust gases by the use of spaced wall and floor sheet elements 38 and 40, respectively, between which air may circulate or insulating material of suitable type may be placed.

To facilitate landing on possibly uneven surfaces, the aircraft is provided with foldable supporting members 42 and operating means therefor comprising rods 44 pivotally connected to the members 42 and to pistons within the cylinders 43 which are in turn pivotally connected to the body. By air or fluid pressure applied to the pistons under control of the pilot, the members 42 may be moved from the position in which they are shown in full lines in FIG. 3, to the positions shown in dotted lines in that FIG. or in the reverse directions.

The aircraft described will, when operated in the manner described, be stable in flight whether moving vertically or horizontally, but, to insure stability under the influence of air turbulence, four relatively small auxiliary jet engines 45, or engines of other type capable to developing thrust in directions generally parallel to the axis of the aircraft, are provided. These are positioned 90° apart as shown and the operation of each is under control of the pilot. It will be appreciated that for certain of the elements shown and described, reasonable equivalents may be substituted.

I claim:
1. An aircraft of the type described comprising, in combination, a generally cylindrical body the axis of which is substantially vertically disposed when the aircraft is at rest or in flight, a jet engine disposed centrally in said body with its axis substantially coincident with axis of said body and with its intake uppermost and discharge port lowermost, a plurality of discharge ports disposed in fixed position relatively to the body and arranged substantially in a circle about and radially spaced from the axis of the engine and at a lower level than the discharge port thereof, radially disposed conduits for leading the products of combustion from said engine to said discharge ports, and means associated with certain of such conduits for varying the direction of flow of gases issuing from said discharge ports.

2. The combination set forth in claim 1 in which said means comprises a plurality of dampers, one for each such port, each adjustably mounted in the discharge port with which it is associated.

3. The combination set forth in claim 1 in which which the fuel receiving tank is supported in the body above and on the axis of the jet engine so that the fuel may flow by gravity to the engine, a plurality of radially extending ducts supported by the body being provided to conduct air to the engine intake.

4. The combination set forth in claim 1 in which the top member of the body is convex in shape and the bottom member is substantially flat, the circular series of discharge ports being located in the plane of the aircraft bottom.

5. The combination set forth in claim 1 in which a circular series of auxiliary vertically disposed jets are mounted on the vehicle equidistantly spaced from the axis of the aircraft and substantially at the level of said discharge ports, and means operable by the pilot is provided for selectively activating said auxiliary jets.

6. The combination set forth in claim 1 in which a circular series of air inlet ports encircles the axis of the engine above the intake thereof, and a conduit conducts inflowing air from each said port to the engine intake.